Figure 6:
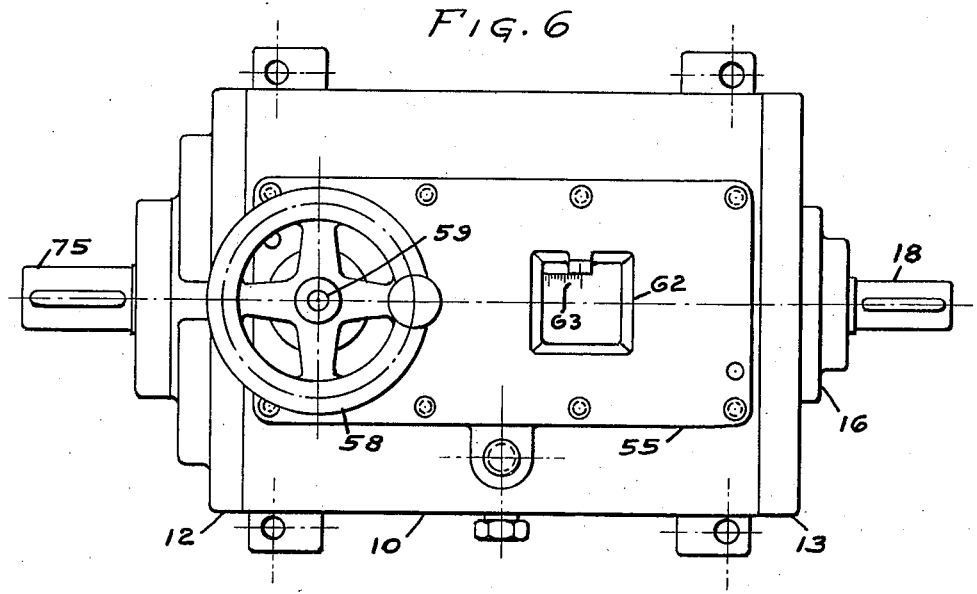

May 22, 1951  P. KLAMP  2,554,463
VARIABLE SPEED TRANSMISSION
Filed Aug. 18, 1948  5 Sheets-Sheet 1
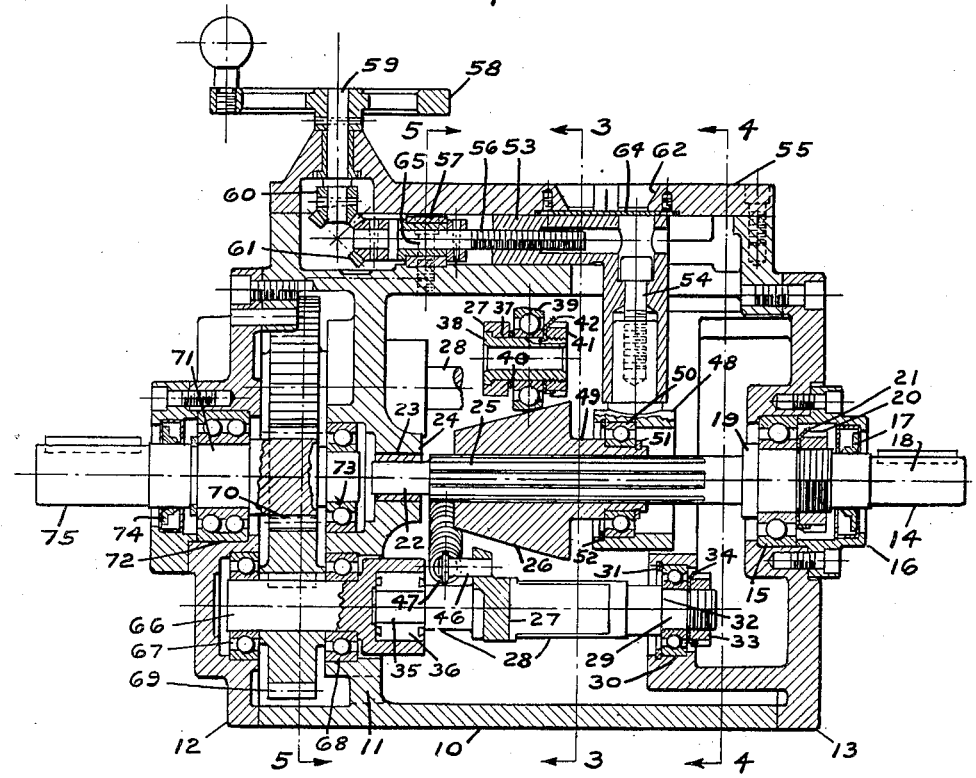
INVENTOR.
Paul Klamp

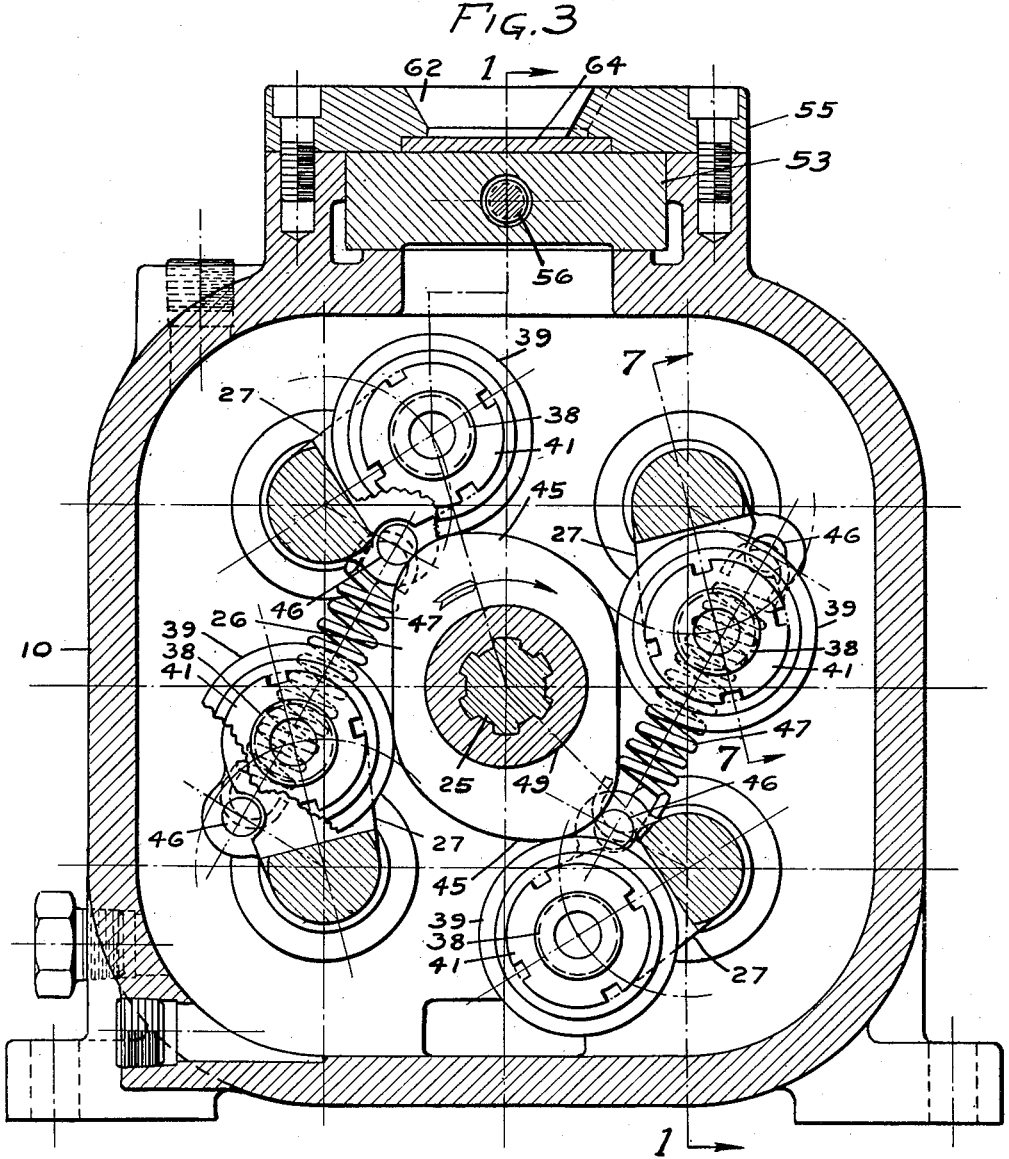

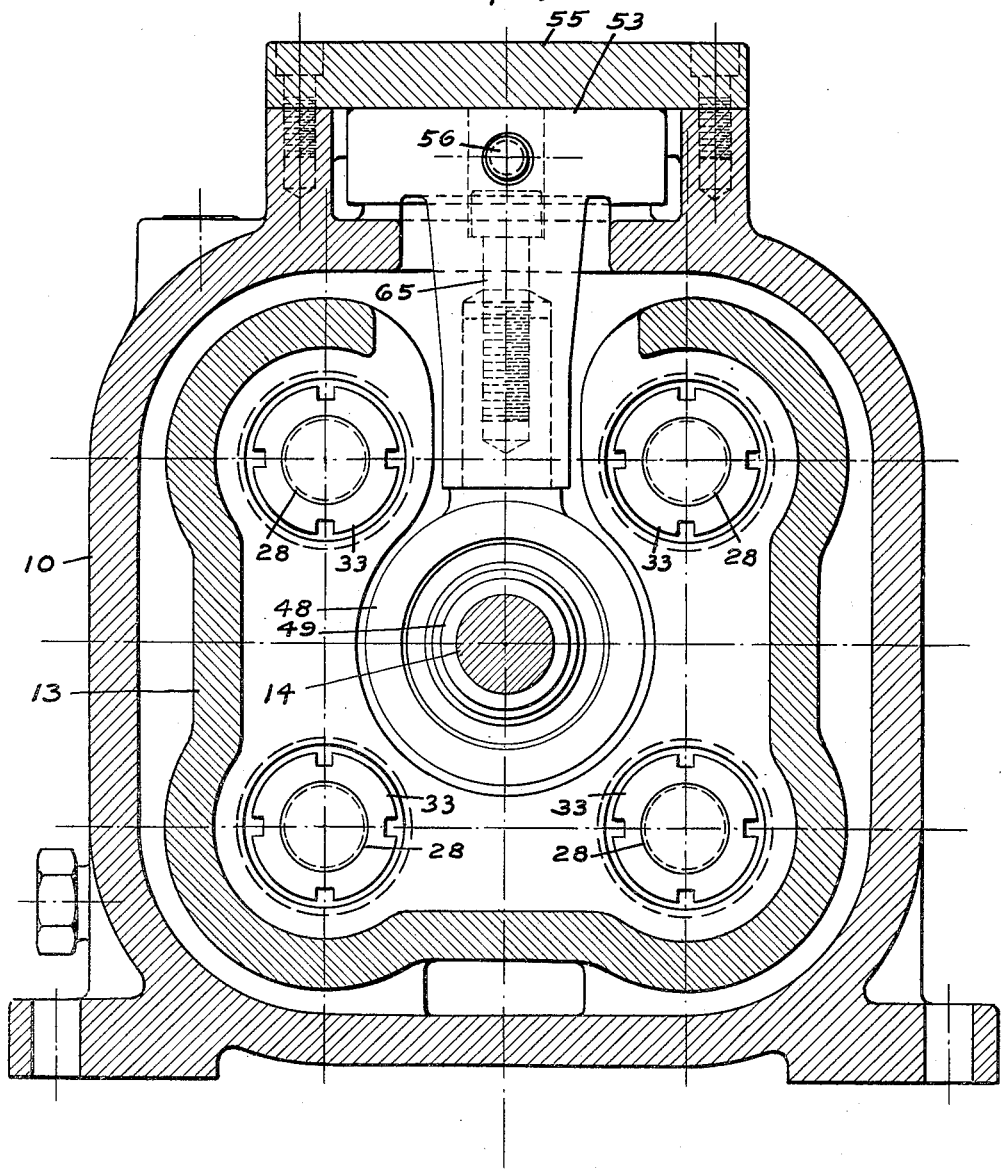

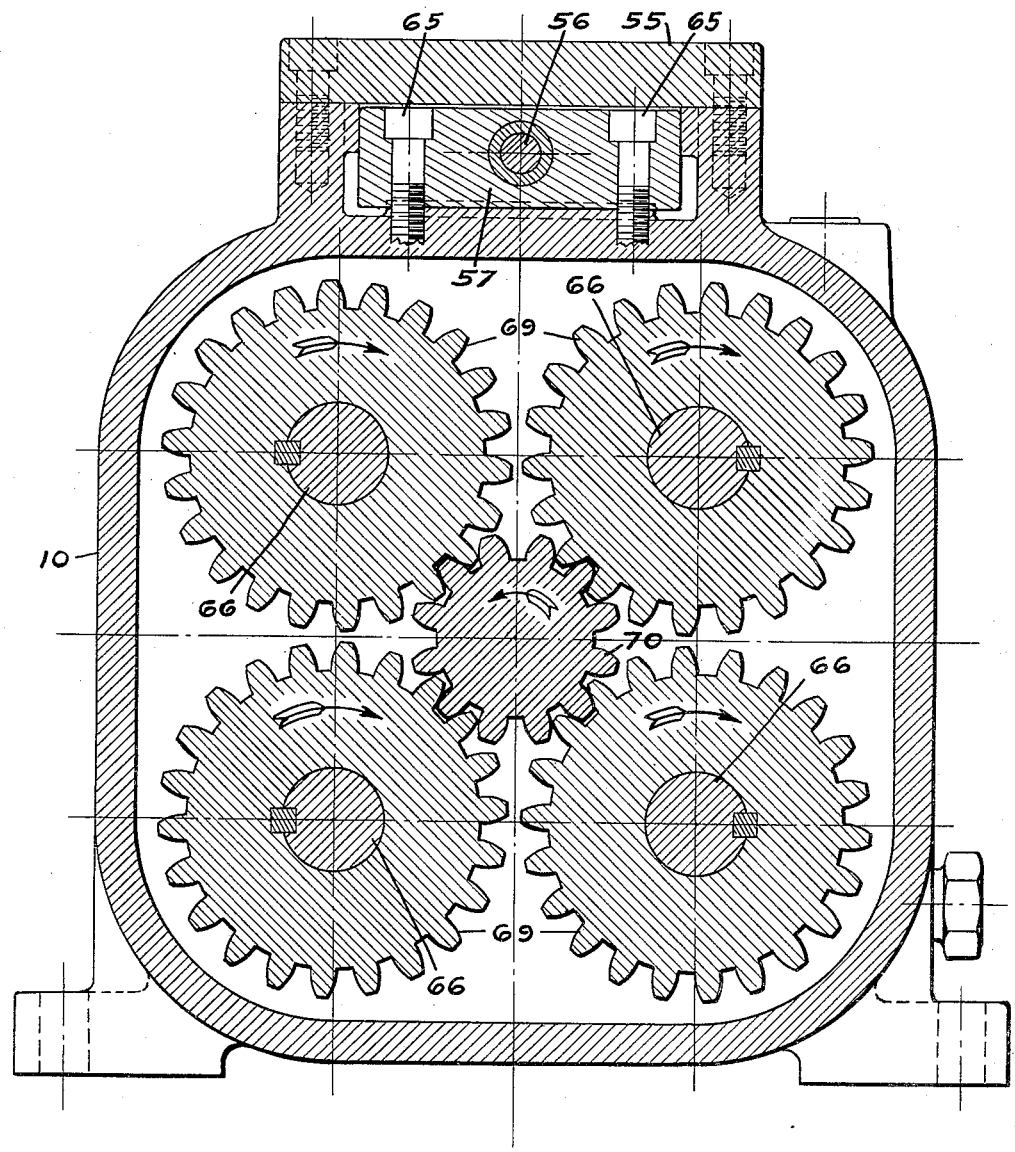

May 22, 1951   P. KLAMP   2,554,463
VARIABLE SPEED TRANSMISSION
Filed Aug. 18, 1948   5 Sheets-Sheet 5

INVENTOR.
Paul Klamp

Patented May 22, 1951

2,554,463

UNITED STATES PATENT OFFICE 2,554,463

VARIABLE-SPEED TRANSMISSION

Paul Klamp, Detroit, Mich.

Application August 18, 1948, Serial No. 44,939

4 Claims. (Cl. 74—124)

My invention relates to variable speed transmissions of the type employing a cam which is rotatively driven by the constant speed shaft of the device. Said cam causes one or more levers to oscillate through an adjustable angle. A free-wheeling or one-direction clutch is interposed between each oscillating lever and a gear train that connects to the variable speed shaft. During part or all of the motion of each oscillating lever in one direction of rotation, said lever drives the variable speed shaft through the corresponding free-wheeling clutch. During the remaining part of each oscillating cycle, free-wheeling action of this clutch takes place.

The chief object of the present invention is to provide a series of rocker arms around a cam having equally spaced cam lobes and to arrange said rocker arms and cam lobes so that all rocker arms occupying alternate positions in the circular spacing around said cam are simultaneously rotated in the same direction during substantially the same period in which the rocker arms occupying the remaining positions are rotated in the opposite direction. As a result, any two adjacent rocker arms oscillate in opposite rotational directions. This makes it possible to connect them with a tension spring in such a manner that both ends of this spring follow each other back and forth, much like a rigid connecting rod, besides causing the cam follower rollers carried by the rocker arms to be urged into contact with the cam. In comparison with previous constructions employing a separate spring for each rocker arm, in the arrangement described the spring deflection is much smaller and the number of springs is only half as great. Therefore, spring loads, power losses, and the number of parts are greatly reduced.

Another object of the invention is to provide a cam specially shaped so as to adapt it to high speed operation.

A further object of the invention is to employ standard ball bearings to serve as cam follower rollers, but with the periphery of the outer race of each ball bearing being spherical or torus-shaped, with the center of the sphere or the center of the torus being offset from the plane which passes through the centers of the balls. Thus an approximately conical shape is produced which complements the general conical shape of the cam, and the load from the cam surface to the cam roller surface is directed towards the balls in the load carrying zone of the ball bearing.

Further objects and advantages will become apparent from the drawings and the following description.

Figure 7:
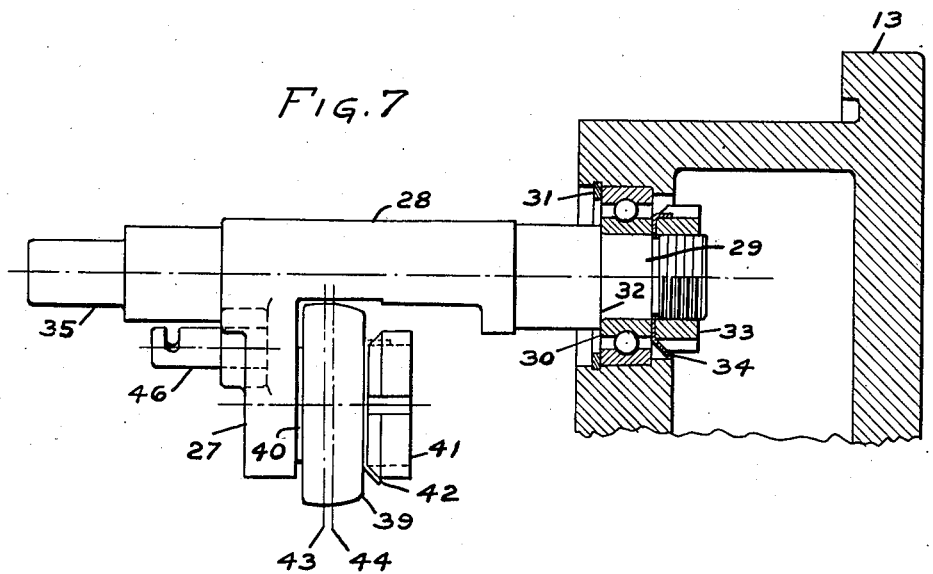

An example of the construction of a variable speed transmission according to my invention is shown in the accompanying drawings in which Figure 1 is a longitudinal section of the apparatus on line 1—1, Fig. 3; Figure 2, a diagram showing the development of a typical cross section through the cam and four cam follower levers and rollers; Figure 3, a vertical cross section on the line 3—3, Fig. 1; Figure 4, a vertical cross section on the line 4—4, Fig. 1; Figure 5, a vertical cross section on the line 5—5, Fig. 1; Figure 6, a plan view; and Figure 7 a section of a part of the apparatus on line 7—7, Fig. 3.

Like numerals refer to like parts throughout the several views and sections.

The variable speed transmission according to my invention is contained in a housing 10 having a vertical partition 11 which divides said housing into two compartments that are closed by cover plates 12 and 13, respectively. A constant speed shaft 14 is mounted in a ball bearing 15 which is mounted in a bore in cover plate 13 and held in place by a closure plate 16, the latter containing a shaft seal 17 through which the shaft 14 extends to form the constant speed shaft extension 18. The shaft 14 is secured endwise by an integral collar 19 and a nut 20 and lock washer 21. The inside end 22 of shaft 14 is mounted in a bearing bushing 23 which is pressed into a bore in hub 24, extending from the partition 11. The central portion 25 of shaft 14 is splined to provide rotary driving engagement with a cam 26 and to allow lengthwise shifting of said cam, the latter having a splined bore which fits with a sliding fit on the splined shaft.

Four rocker arms 27, each having an integral shaft 28 (see Fig. 7), are placed around the cam 26 so that the axes of the rocker arm shafts 28 are equidistant from each other and equidistant from the axis of said cam and parallel to the axis of the latter. One end 29 of each shaft 28 is mounted in a ball bearing 30 which is held in a bore in cover plate 13 by a snap ring 31. The shaft 28 is secured endwise by a shoulder 32 and a nut 33 and lock washer 34. The other end 35 of each shaft 28 is guided in a free-wheeling clutch 36 of known construction.

Each rocker arm 27 has a bore 37 into which a tubular stud 38 is pressed (see Fig. 1). A cam follower roller 39 is mounted on said stud, between a spacer 40 and a nut 41 with lock washer 42. Each roller 39 consists of a ball bearing the inner race of which is tightly secured on stud 38 by nut 41 and lock washer 42. The periphery of each roller 39 is spherical or torus-shaped, with the center 43 of the sphere or the centers of the transverse curvature of the torus being located outside of the plane 44 which passes through the centers of the balls. The purpose of this offset of center 43 is to produce an approximately conical surface to complement the approximately conical form of the cam 26. Still another purpose of offsetting the center 43 is to direct the load from the cam surface to the roller surface in such a way that this load points to the center of the load carrying balls as closely as possible.

The cam 26 has two equally shaped, diametrically opposite lobes 45 which have a maximum rise and fall at one end of the cam and taper down to zero rise and fall at the other end. As can be seen in Fig. 3, during clockwise rotation of the cam 26, the rise of each cam lobe forces one of the rollers 39 outward, thereby causing the corresponding rocker arm 27 to turn in a counterclockwise direction. Fig. 3 shows that the two cam lobes are forcing two opposite cam rollers apart in such a way that the cam acts as a rotary wedge, with the two reacting forces from said two rollers forming a so-called "couple of forces" which balance each other in such a manner that no resultant radial force is acting on the cam. Consequently, the driving pressures between the cam and cam follower rollers do not produce any radial loads on the two cam shaft bearings 15 and 23.

After the peak of a cam lobe has passed the roller, the latter must be forced towards the center of the cam in order to cause the roller to follow the falling slope of the lobe. To accomplish such a following action, a spring stud 46 is pressed into each rocker arm 27, and two tension springs 47 are fastened to the four studs 46 in such a way that each spring connects two adjacent rocker arms and forces them to turn in a clockwise direction.

In the position of the component parts as shown in Fig. 3, the upper left spring stud is about to start moving towards the lower left spring stud. The latter is moving away from the upper left stud. Thus the two studs will be moving in the same direction and the length of the spring is changed very little. With a cam as shown and described, such following action of each pair of spring studs takes place the greater part of the time. Consequently, the expansion and contraction of each spring is less than would be the case if one end were fastened to a rocker arm and the other end to a fixed point. Thus the arrangement shown not only saves two springs but also reduces the amount of expansion and contraction of the springs.

In order to change the angle of oscillation of the rocker arms, provision is made to shift the cam 26 lengthwise. A shifter ring 48 is connected to the hub extension 49 of the cam 26, by means of a ball bearing 50 and snap rings 51 and 52. Said shifter ring 48 has an upwardly extending cylindrical arm which fits into a bore of a shifter block 53. A screw 54 is employed to fasten said shifter ring to the shifter block 53. The latter is guided for lengthwise motion in a rectangular opening formed by a channel in the top portion of housing 10 and by a cover plate 55. Lengthwise motion of said shifter block is obtained from an adjusting screw 56 which is rotatably mounted in a bearing block 57 and is turned by means of a hand wheel 58, hand wheel shaft 59 and bevel gears 60 and 61. An opening 62 in cover plate 55 permits reading of graduations 63, engraved into the top surface of shifter block 53. The bottom of opening 62 is closed by a transparent window 64. A reference line on one side of opening 62 is used in combination with graduations 63 for reading the desired setting of shifter block 53. The bearing block 57 is fastened to the housing 10 by two screws 65.

The driving motion is transmitted by each of the four rocker arm shafts 28 through its end 35 to one of the four free-wheeling clutches 36 and from there to the bore in the end of one of four clutch shafts 66, causing the latter to rotate on bearings 67 and 68. Each clutch shaft 66 carries a clutch shaft gear 69. The four gears 69 are in mesh with a central gear 70 which is integral with the variable speed shaft 71. The latter is mounted on bearings 72 and 73 and extends through a seal 74 to form the variable speed shaft extension 75.

The free wheeling clutches 36 drive the clutch shafts 66 and clutch shaft gears 69 when the cam 26 forces the cam follower rollers 39 to move outwardly relative to the cam shaft axis. According to Fig. 3 this motion causes the rocker arms 27 to rotate in a counterclockwise direction. At the end of the cam rise, a slowdown and then a reversal of this motion takes place. Since gears 69 and 70 are in constant mesh, the clutch shafts 66 continue to rotate, whereas the rocker arm 37 which carries the roller 39 that has passed a cam rise, slows down and reverses. Free-wheeling action of the corresponding clutch 36 takes place now. The free-wheeling clutches are of the type which follow the motion of the bore in which they are inserted, if free-wheeling takes place. Therefore they follow the rotation of clutch shafts 66 when the corresponding rocker arm shaft ends 35 slow down and reverse their rotation. As a result, the number of oscillating parts is held to a minimum, consisting of the rocker arm and cam follower roller assemblies, thereby keeping the inertia forces of the system as low as possible.

As was described, the cam 26 has two lobes which have a maximum rise and fall at one end of the cam and taper down to zero rise and fall at the other end. Fig. 2 shows the development 76 of a typical cross section of cam 26. Arrow 77 indicates the direction of motion of the cam contour in relation to the four rollers 39a, 39b, 39c and 39d. The four rocker arms 27a, 27b, 27c and 27d swing around the fixed axes 78a, 78b, 78c and 78d, spaced apart by the distances 79, 79 and 79, each of which corresponds to a 90 degree angle. The two portions 80a and 80b of the cam contour are the driving zones and are of such shape that a uniform ratio between the angular velocities of cam 26 and rocker arms 27 is obtained. Each of said two driving zones is slightly greater than 90 degrees so that an overlap action is obtained. For example, the right or lower end of zone 80a will move under roller 39c just before the left or upper end of the same zone has passed roller 39b.

Zones 81a and 81b of the cam contour are provided for the deceleration of the outwardly moving cam follower rollers, the deceleration force being furnished by springs 47. Next to come in contact with the rollers are the acceleration zones 82a and 82b which produce the first part of the rocker arm return motion towards the cam axis. The acceleration force is furnished by springs 47, also, while said zones 82a and 82b control the magnitude of the acceleration.

The next zones 83a and 83b serve to decelerate the return motion of the rollers, while zones 84a and 84b furnish the acceleration in the opposite direction again, until the speed of the now outwardly moving rollers is built up to the driving zone speed. The deceleration forces in zones 83a and 83b and the accelerating forces in zones 84a and 84b are furnished by the cam itself. But, these forces are much smaller than the driving forces active in zones 80a and 80b. Therefore the acceleration and deceleration forces furnished by the cam in zones 83a, 83b, 84a and 84b can be and are chosen to be greater than the acceleration and deceleration forces furnished by springs 47 in zones 81a, 81b, 82a and 82b. The resulting unequal division of the acceleration and deceleration zones, whereby the combined length of zones 81a plus 82a (or 81b plus 82b), is greater than the combined length of zones 83a plus 84a (or 83b plus 84b), allows more time for the accelerating and decelerating motions produced by springs 47. Consequently, the cam can be rotated faster than would be possible with an even zone division.

The cam 26, shaped as described, has perfect dynamic balance. Further, all dynamic and mechanical forces active at each pair of opposite rocker arms and cam follower rollers are always in exact balance. Consequently, no disturbing vibrations will occur in a variable speed transmission as described, so that high speeds of operation are possible and practical.

While the form of the apparatus disclosed and described herein is a preferred construction, it is understood that mechanical alterations can be made without departing from the basic principle underlying the invention and that all modifications which fall within the scope of the appended claims are intended to be included herein.

Having thus fully described my invention, what I claim as new and desire to secure by Letters Patent is:

1. A variable speed transmission comprising a driving shaft, a cam rotatively driven by said driving shaft, said cam having equally spaced cam lobes of equal size and shape which are arranged so that dynamic balance of said cam is obtained, a multiplicity of rocker arms equally spaced around the axis of said cam, each of said rocker arms carrying a cam follower roller, the rotation of said cam adapted to oscillate said rocker arms, said rocker arms and cam lobes being arranged so that all rocker arms occupying alternate positions in the circular spacing around said cam are simultaneously rotated in the same direction during substantially the same period in which the rocker arms occupying the remaining positions are rotated in the opposite direction, each two adjacent rocker arms being connected by a spring in such a manner that said spring tends to rotate both rocker arms in the same direction, means for varying the angle of oscillation of said rocker arms, a gear train, a driven shaft, and clutch means for operably connecting said rocker arms to said gear train.

2. A variable speed transmission comprising a driving shaft, a cam rotatively driven by said driving shaft, said cam having equally spaced cam lobes of equal size and shape which are arranged so that dynamic balance of said cam is obtained, a multiplicity of rocker arms equally spaced around the axis of said cam, each of said rocker arms carrying a cam follower roller, the rotation of said cam adapted to oscillate said rocker arms, said rocker arms and cam lobes being arranged so that all rocker arms occupying alternate positions in the circular spacing around said cam are simultaneously rotated in the same direction during substantially the same period in which the rocker arms occupying the remaining positions are rotated in the opposite direction, a series of tension springs, each connecting two adjacent rocker arms in such a manner that the length of said spring remains substantially constant when said two rocker arms are rotated equal angular amounts in opposite directions, means for varying the angle of oscillation of said rocker arms, a gear train, a driven shaft, and clutch means for operably connecting said rocker arms to said gear train.

3. A variable speed transmission comprising a driving shaft, a cam rotatively driven by said shaft, said cam having diametrically opposite cam lobes of equal size and shape, each of said cam lobes gradually varying in throw axially of said cam, a multiplicity of rocker arms arranged around said cam so that each of said rocker arms swings on an axis parallel to the axis of said cam, the axes of said rocker arms being equidistant from each other and equidistant from the axis of said cam, each of said rocker arms carrying a cam follower roller having a torus-shaped periphery, said cam being adapted to oscillate said rocker arms, said rocker arms and cam lobes being arranged so that all rocker arms occupying alternate positions in the circular spacing around said cam are simultaneously rotated in the same direction during substantially the same period in which the rocker arms occupying the remaining portions are rotated in the opposite direction, a series of tension springs, each of said springs connecting two adjacent rocker arms in such a way that the length of said spring remains substantially constant when said two rocker arms are rotated equal angular amounts in opposite directions, a gear train, a driven shaft, clutch means for operably connecting said rocker arms to said gear train, and means for relatively adjusting said cam and rocker arms axially of said cam.

4. A variable speed transmission comprising a driving shaft, a cam rotatively driven by said driving shaft, said cam having diametrically opposite cam lobes, each of said cam lobes having a maximum rise and fall at one end and tapering down to a minimum rise and fall axially of said cam, a multiplicity of rocker arms spaced around said cam, each of said rocker arms carrying a cam follower roller, each two adjacent rocker arms being connected by a spring in such a manner that said spring tends to turn said two rocker arms in the same direction and to force the respective cam follower rollers against said cam, the rotation of said cam being adapted to oscillate said rocker arms, a gear train, a driven shaft, clutch means for operably connecting said rocker arms to said gear train, and means for relatively adjusting said cam and rocker arms axially of said cam.

PAUL KLAMP.

REFERENCES CITED

The following references are of record in the file of this patent:

UNITED STATES PATENTS

| Number | Name | Date |
| --- | --- | --- |
| 1,497,445 | Janssen | June 10, 1924 |
| 1,630,273 | Nordwick | May 31, 1927 |
| 1,658,318 | Wineman | Feb. 7, 1928 |

FOREIGN PATENTS

| Number | Country | Date |
| --- | --- | --- |
| 25,410 | Great Britain | Nov. 10, 1907 |
| 556,492 | France | Apr. 16, 1923 |
| 590,087 | France | Mar. 10, 1925 |
| 854,258 | France | Jan. 9, 1940 |